Figure 3:
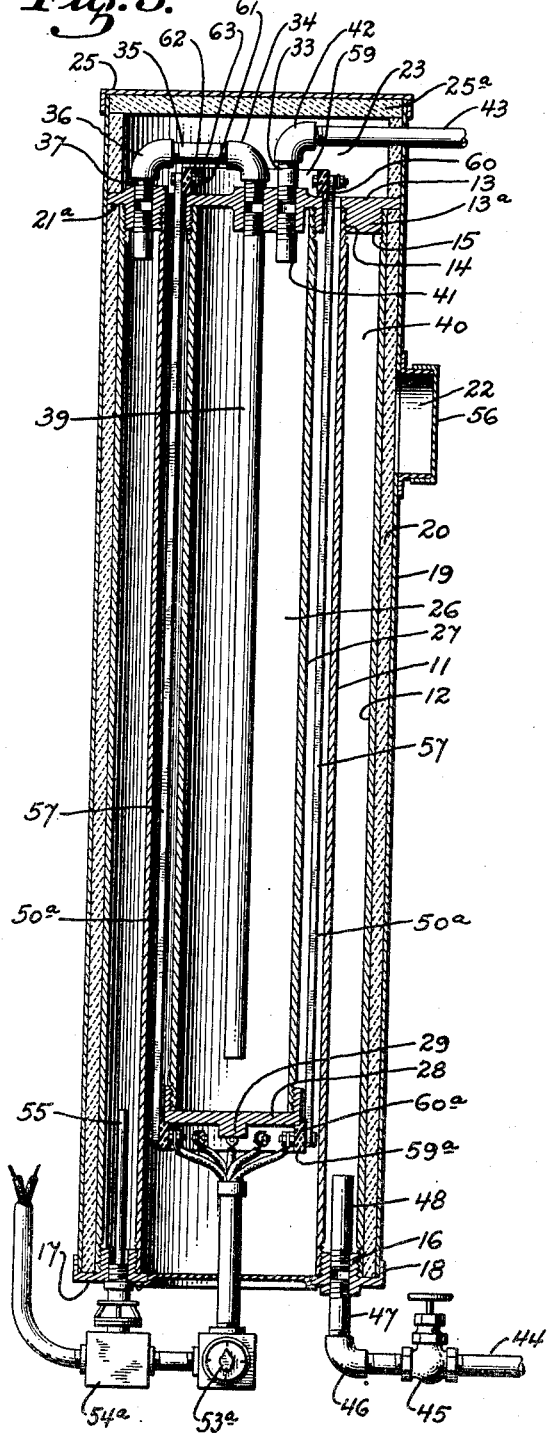

Dec. 22, 1931.   R. B. THOMAS   1,837,597
WATER HEATER
Filed April 22, 1930   2 Sheets-Sheet 1
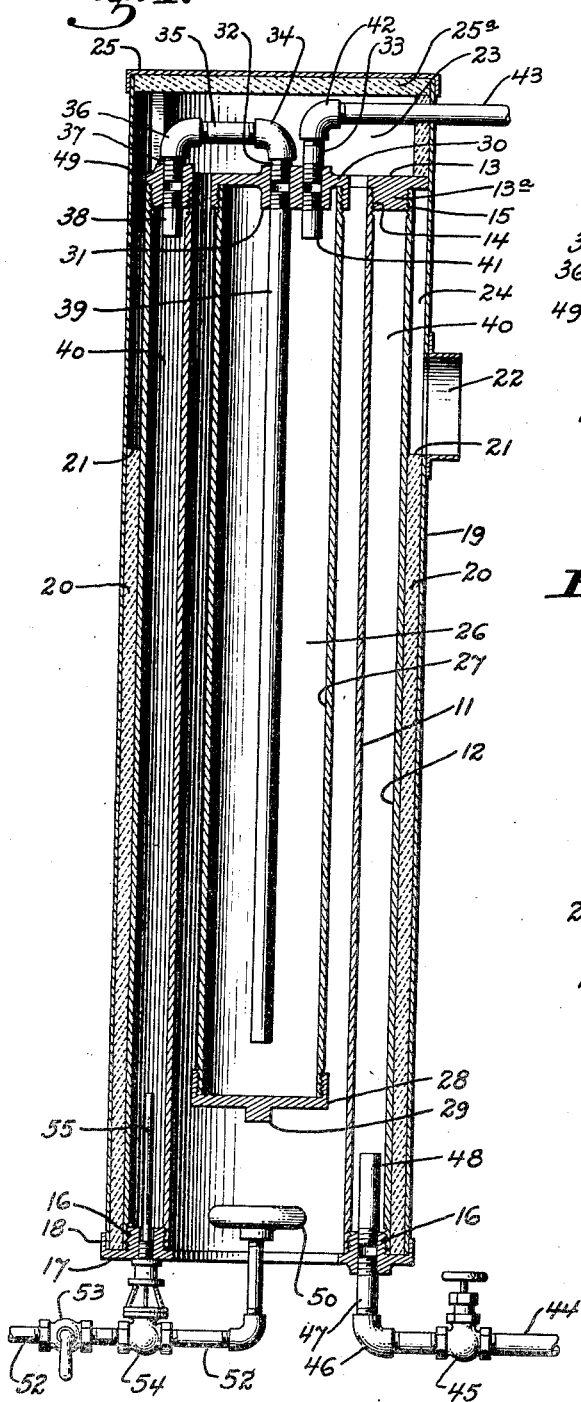
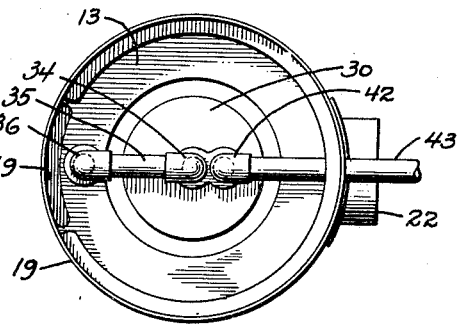
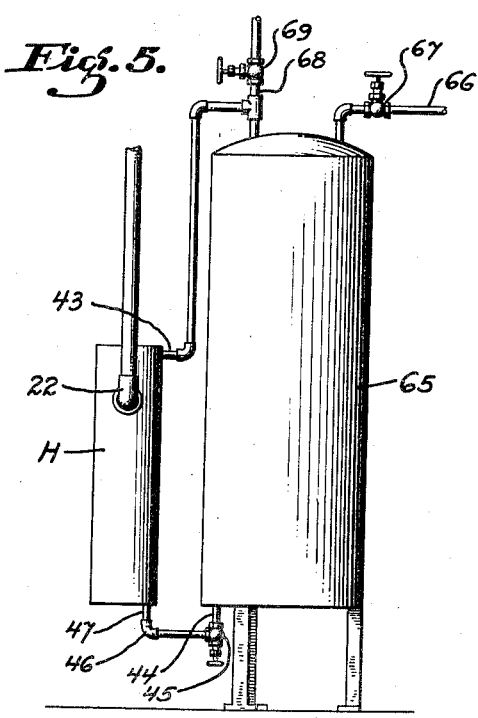
INVENTOR.
Robert B. Thomas.
BY
Townsend, Loftus & Abbett
ATTORNEYS.

Dec. 22, 1931.   R. B. THOMAS   1,837,597
WATER HEATER
Filed April 22, 1930   2 Sheets-Sheet 2

INVENTOR.
Robert B. Thomas.
BY
Townsend, Loftus & Affett
ATTORNEYS.

Patented Dec. 22, 1931

1,837,597

UNITED STATES PATENT OFFICE

ROBERT B. THOMAS, OF NAPA, CALIFORNIA

WATER HEATER

Application filed April 22, 1930. Serial No. 446,297.

My invention relates to water heaters wherein the heat may be generated or supplied by any suitable means, as by burning fuel, by electrical heating means, or by any other useful source of heat, and it may be used either as a heating and storage tank, or for heating water or other liquid flowing therethrough.

An object of my invention is to provide a heater for water or other fluid which may be economically constructed, and which may be easily assembled and disassembled, so that replacements and repairs may be made quickly and at small cost.

Another object of my invention is to provide a water heater containing the minimum number of parts wherein the various parts are so related to each other that couplings, supports and other parts heretofore thought necessary may be omitted.

Another object of my invention is to provide a heater of the type described, wherein the heating units are easily and quickly removable and interchangeable, so that the device may be used either with a fuel heater or with an electrical heater.

Other objects of the invention will be apparent from the appended description.

Referring to the drawings, which form a part of this specification and wherein similar reference characters designate similar parts:—

Figure 4:
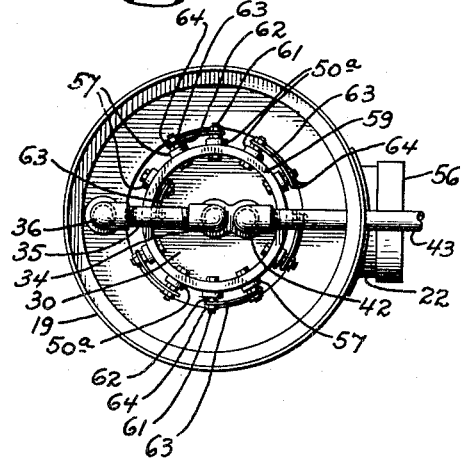

Fig. 1 is a vertical sectional view through my water heater having a gas or oil burner, Fig. 2 is a top plan view thereof with the cover removed, Fig. 3 is a view similar to Fig. 1, with an electrical heater substituted for the combustion heater, Fig. 4 is a view thereof similar to Fig. 2, and Fig. 5 is a plan view of a combination of my heater with a water tank containing water to be heated, the specific heating means being omitted.

Referring to Fig. 1, a cylindrical shell 11 is concentrically arranged within a similar shell 12, these being suitably attached at their upper ends to the annular flange 13a on the disk 13, as by screw threads 14, 15, and they are similarly attached at their lower ends to the annular flange 16 on the annular end piece 17, on which is an upstanding flange 18. A cylindrical casing 19 surrounds and is spaced from the shell 12, insulation 20 of any suitable type and having sufficient heat resisting qualities, such as asbestos or the like, being interposed between the walls of the shell 12 and of the casing 19, from about the bottom of the device to a point short of the top, the uppermost point of the insulation being indicated at 21, above which point an outlet flue 22 is provided to conduct away the hot gases of combustion which have been used for heating the water. As a matter of safety, the outlet flue 22 should be connected with a chimney or other means for conducting away the gases of combustion. The casing 19 contacts at its upper end with the external periphery of the disc 13, which closes off to a great extent the upper compartment 23 from the compartment 24 above the top of the insulation by the upper walls of the shell 12 and of the housing 19, and is preferably provided with insulation 25a while the lower end of the casing 19 fits within the upstanding flange 18. The cap 25 is removably attached to the casing 19.

A hollow member 26, comprising a cylindrical shell 27 closed at its lower end by a cap 28 screw-threaded thereon and having a non-round projection 29 adapted to be turned by a suitable tool, and closed at its upper end by a cap 30 screw-threaded thereon, is located centrally within the inner shell 11 and spaced therefrom. The cap 30 is provided with an enlarged boss 31 having screw-threaded perforations therethrough to receive the nipples 32, 33. An elbow 34 is connected to the nipple 32; a short length of pipe 35 is connected to the elbow 34 and to the elbow 36, which in turn is connected to a nipple 37 having a screw-threaded connection with an aperture in the disc 13, in which, if desired, a nipple 38 may also be screw-threaded. The pipe 39, centrally within the member 26 and extending to the lower part thereof, has a screw-threaded connection with the same aperture as the nipple 32, whereby communication is established between the interior of the member 26 and the chamber 40 formed by the walls of the shells 11 and 12 and the end members 13 and 16. If desired, a nipple 41 may be screwed into the same opening as the nipple 33 to project slightly into the hollow member 26. An elbow 42 has a screw-threaded connection with the nipple 33 and this elbow also has a screw-threaded connection with the pipe 43 extending through the housing 19 to the outside of the device and connected to the point at which the hot water is desired. A cold water supply pipe 44, having a valve 45 therein, is connected to an elbow 46 which, in turn, is connected with a nipple 47 having a screw-threaded connection with an opening in the annulus 16 and, if desired, a nipple 48 extending into the chamber 40 may be connected with such opening. The disc 13 is provided with a cut-away portion or opening 49 to establish communication between the compartment 23 and the compartment 24. A suitable burner 50 is located below the inner member 26, but above the lower end of the device for the purpose of supplying the necessary heat, this burner being suitably supported, as by the pipe 52. Pipe 52, provided with a manually operable valve 53, for supplying gas or other suitable fuel, is connected to the burner, said pipe also being provided with a valve 54, which is controlled by a thermostat 55 within the chamber 40.

The hot combustion gases pass upwardly between the shells 27 and 11 into the chamber 23, from which they pass through the opening 49 into the chamber 24 and out through the flue 22. The cold water flowing through the pipe 44 enters the chamber 40, from which it passes by means of the nipple 36, pipe 35, and nipple 34, and pipe 39, into the lower end of the chamber 26, from which it passes out by means of the nipple 41, elbow 42, and pipe 43. It will thus be apparent that the hottest gases contact with the coldest water as well as with the preheated water, with the result that the water is heated very rapidly, and a very rapid flow of water may be maintained through the device.

The general arrangement may be quite similar when an electrical heater is to be used, and the only change necessary is the removal of the fuel burner and the replacement thereof with an electrical heater. I prefer, however, to make some additional changes in order to obtain the maximum beneficial effect. The flue 22 is not needed when an electrical heater is used and I may omit it altogether or it may be closed off with a cap 56 (see Fig. 3), and I prefer to continue the insulation 20 up to a higher point, or even to the top, since no space or chamber 24 is now needed for conducting off the combustion gases; and for a similar reason, the opening 49 in the disc 13 may be omitted or closed off.

In place of the burner 50, I provide an electrical heating means 50a extending into the space formed between the walls 27 and 11 and suitably supported, as by a member 26. The electrical circuit includes a switch 53a for controlling the current to the heating means and it also includes a switch 54a controlled by the thermostat 55 in the water to be heated and actuated by the temperature thereof. The electrical heating means comprises a series of electrical resistance units 57 located between the inner and outer chambers for the liquid, that is, within the space between the walls 27 and 11. The electrical heating units preferably extend substantially the whole length of such space, and they may consist of rigid bars having a suitable low degree of electrical conductivity. The specific details of such units form no part of the present invention and they need therefore not be described further. The resistance bars 50a may be suitably clamped at the upper ends thereof to a supporting ring 59 of insulating material having a depending flange 60, whereby these rings may rest on the outer edge of the cap 30. Metal bolts 61 and nuts 62 clamp the bars 50a to the ring 59, and suitable connection is made between the resistance bars by connector strips 63 connecting the proper bolts 61 at the top of the bars 50a, these connector strips being held on the bolts by means of nuts 64. The resistance elements 50a are similarly clamped at their lower ends to insulating rings 59a having an upstanding flange 60a whereby this lower insulating ring will be retained against the outer edge of the cap 28. It will thus be apparent that the insulating elements may be retained in fixed position with respect to the inner container and also with respect to the outer container.

It will thus be apparent that the device may be used interchangeably with either a fuel burner or an electrical resistance heater, either of which may be removed from or assembled with the device, as will now be obvious, without necessitating any substantial changes in the structure or arrangement.

The switch 53a may, of course, be capable of several degrees of heat adjustment.

In Fig. 5 I show my heater diagrammatically in combination with a tank 65, which is provided with a supply pipe 66, in which is a valve 67, and which is also provided with an outlet pipe 68, in which is a valve 69. With the tank 65 substantially full and with the heater in operation, sufficient circulation will result from the difference in temperatures of the water in the tank and of that in the heater to cause all of the water in the tank to pass through the heater and thereby to heat quickly the water in the tank; and this result will be obtained with the valves 67 and 69 either open or closed. With these valves open there will be a continuous flow of cold water into the tank through the pipe 66 and a continuous outflow of hot water through the pipe 68.

With my improved structure, the inner water container needs no supporting means in addition to that shown and described. Furthermore, my novel structure is such that the cold water enters the heater at the bottom thereof so that any vaporous moisture present will not be condensed by the cold surface since such moisture will pass upwardly.

The piping used in my heater may be of any suitable material such as iron, or copper, or other metal or alloy, and this is also true of the casings, although I prefer to have the latter of aluminum.

While I have in this specification referred to the preferred embodiment of my invention, I have done so by way of illustration, and not as limiting it, since various changes may be made therein without departing from the spirit of my invention, the scope of which is defined in the appended claims.

Having thus described my invention, what I claim and desire to secure by Letters Patent of the United States is—

1. A fluid heater adapted to be operated by fuel or electricity comprising an upright cylindrical wall, a closure member attached to the upper end thereof, an annulus at the inner face of said wall adjacent to and spaced from the upper end of said wall, a downwardly projecting annular flange on said annulus within and spaced from said wall, an annulus at the bottom of said cylindrical wall, an upwardly projecting annular flange thereon, said last mentioned annulus within and spaced from said wall, a cylindrical wall attached to the outer faces of said annular flanges, a cylindrical wall attached to the inner faces of said annular flanges, a cylindrical casing within said cylindrical walls and having inlet and outlet openings, a conduit connecting the space between said second and third mentioned cylindrical walls with said inlet opening, a pipe connected with said outlet opening and extending to the outside of said heater, an opening in said second mentioned annulus leading into the space between said second and third mentioned walls, said first mentioned annulus having an opening therethrough connecting the space between said first and second walls with the space above said first mentioned annulus, said cylindrical walls extending downwardly beyond said casing, and a source of heat in the space defined by said third mentioned wall and by said casing.

2. A fluid heater adapted to be operated by fuel or electricity comprising an upright cylindrical wall, a closure member attached to the upper end thereof, an annulus at the inner face of said wall adjacent to and spaced from the upper end of said wall, a downwardly projecting annular flange on said annulus within and spaced from said wall, an annulus at the bottom of said cylindrical wall, an upwardly projecting annular flange thereon, said last mentioned annulus within and spaced from said wall, a cylindrical wall attached to the outer faces of said annular flanges, a cylindrical wall attached to the inner faces of said annular flanges, a cylindrical casing within said cylindrical walls and having inlet and outlet openings, a conduit connecting the space between said second and third mentioned cylindrical walls with said inlet opening, a pipe connected with said outlet opening and extending to the outside of said heater, an opening in said second mentioned annulus leading into the space between said second and third mentioned walls, said first mentioned annulus having an opening therethrough connecting the space between said first and second walls with the space above said first mentioned annulus, said cylindrical walls extending downwardly beyond said casing, and a fuel burner within said third mentioned wall and below said casing.

3. A fluid heater adapted to be operated by fuel or electricity comprising an upright cylindrical wall, a closure member attached to the upper end thereof, an annulus at the inner face of said wall adjacent to and spaced from the upper end of said wall, a downwardly projecting annular flange on said annulus within and spaced from said wall, an annulus at the bottom of said cylindrical wall, an upwardly projecting annular flange thereon, said last mentioned annulus within and spaced from said wall, a cylindrical wall attached to the outer faces of said annular flanges, a cylindrical wall attached to the inner faces of said annular flanges, a cylindrical casing within said cylindrical walls and having inlet and outlet openings, a conduit connecting the space between said second and third mentioned cylindrical walls with said inlet opening, a pipe connected with said outlet opening and extending to the outside of said heater, an opening in said second mentioned annulus leading into the space between said second and third mentioned walls, said first mentioned annulus having an opening therethrough connecting the space between said first and second walls with the space above said first mentioned annulus, said cylindrical walls extending downwardly beyond said casing, and electrical heating elements surrounding the cylindrical face of said casing and supported thereby.

4. A fluid heater comprising an upright cylindrical wall, a closure member attached to the upper end thereof, an annulus at the inner face of said wall adjacent to and spaced from the upper end of said wall, a downwardly projecting annular flange on said annulus within and spaced from said wall, an annulus at the bottom of said cylindrical wall, an upwardly projecting annular flange on said last mentioned annulus within and spaced from said wall, both said annuli having screw threads on their inner and outer cylindrical faces, a cylindrical wall screw threaded to the outer faces of said annular flanges, a cylindrical wall screw threaded to the inner faces of said annular flange, a cylindrical casing within said cylindrical wall and comprising a length of pipe screw threaded at both ends, a closure member screwed onto the lower end of said casing, a closure member screwed onto the upper end of said casing, said upper closure member having a screw threaded opening, a length of pipe screwed therein and extending adjacent to and short of the bottom of said casing, a nipple screwed in said opening, an elbow screwed on said nipple, a short length of pipe screwed on said elbow, an elbow screwed on the said short length of pipe, a nipple screwed in said last mentioned elbow, an opening in said first mentioned annulus and annular flange, said nipple being screwed in said opening, whereby communication is established between the space between said second and third cylindrical walls and the bottom of said casing, the top closure member of said casing having another opening therein, a nipple screwed therein, an elbow screwed thereon, and a length of pipe screwed in said elbow and projecting to the outside of said heater, and said second mentioned annulus having an opening therein connecting the exterior of said heater with the space between said second and third mentioned cylindrical walls at a point substantially diametrically opposite the point at which is located the connection between the space between said second and third mentioned cylindrical walls and said casing, said cylindrical walls extending downwardly beyond said casing, and a source of heat in the space defined by said third mentioned wall and by said casing.

5. A fluid heater comprising an upright cylindrical wall, a closure member attached to the upper end thereof, an annulus at the inner face of said wall adjacent to and spaced from the upper end of said wall, a downwardly projecting annular flange on said annulus within and spaced from said wall, an annulus at the bottom of said cylindrical wall, an upwardly projecting annular flange on said last mentioned annulus within and spaced from said wall, both said annuli having screw threads on their inner and outer cylindrical faces, a cylindrical wall screw threaded to the outer faces of said annular flanges, a cylindrical wall screw threaded to the inner faces of said annular flange, a cylindrical casing within said cylindrical wall and comprising a length of pipe screw threaded at both ends, a closure member screwed onto the lower end of said casing, a closure member screwed onto the upper end of said casing, said upper closure member having a screw threaded opening, a length of pipe screwed therein and extending adjacent to and short of the bottom of said casing, a nipple screwed in said opening, an elbow screwed on said nipple, a short length of pipe screwed on said elbow, an elbow screwed on the said short length of pipe, a nipple screwed in said last mentioned elbow, an opening in said first mentioned annulus and annular flange, said nipple being screwed in said opening, whereby communication is established between the space between said second and third cylindrical walls and the bottom of said casing, the top closure member of said casing having another opening therein, a nipple screwed therein, an elbow screwed thereon, and a length of pipe screwed in said elbow and projecting to the outside of said heater, and said second mentioned annulus having an opening therein connecting the exterior of said heater with the space between said second and third mentioned cylindrical walls at a point substantially diametrically opposite the point at which is located the connection between the space between said second and third mentioned cylindrical walls and said casing, said cylindrical walls extending downwardly beyond said casing, and a fuel burner within said third mentioned wall and below said casing.

6. A fluid heater comprising an upright cylindrical wall, a closure member attached to the upper end thereof, an annulus at the inner face of said wall adjacent to and spaced from the upper end of said wall, a downwardly projecting annular flange on said annulus within and spaced from said wall, an annulus at the bottom of said cylindrical wall, an upwardly projecting annular flange on said last mentioned annulus within and spaced from said wall, both said annuli having screw threads on their inner and outer cylindrical faces, a cylindrical wall screw threaded to the outer faces of said annular flanges, a cylindrical wall screw threaded to the inner faces of said annular flange, a cylindrical casing within said cylindrical wall and comprising a length of pipe screw threaded at both ends, a closure member screwed onto the lower end of said casing, a closure member screwed onto the upper end of said casing, said upper closure member having a screw threaded opening, a length of pipe screwed therein and extending adjacent to and short of the bottom of said casing, a nipple screwed in said opening, an elbow screwed on said nipple, a short length of pipe screwed on said elbow, an elbow screwed on the said short length of pipe, a nipple screwed in said last mentioned elbow, an opening in said first mentioned annulus and annular flange, said nipple being screwed in said opening, whereby communication is established between the space between said second and third cylindrical walls and the bottom of said casing, the top closure member of said casing having another opening therein, a nipple screwed therein, an elbow screwed thereon, and a length of pipe screwed in said elbow and projecting to the outside of said heater, and said second mentioned annulus having an opening therein connecting the exterior of said heater with the space between said second and third mentioned cylindrical walls at a point substantially diametrically opposite the point at which is located the connection between the space between said second and third mentioned cylindrical walls and said casing, said cylindrical walls extending downwardly beyond said casing, and electrical heating elements surrounding the cylindrical face of said casing and supported thereby.

ROBERT B. THOMAS.